L. ATWOOD.
FISHING REEL.
APPLICATION FILED JAN. 8, 1920.
1,358,049.
Patented Nov. 9, 1920.
Fig.1
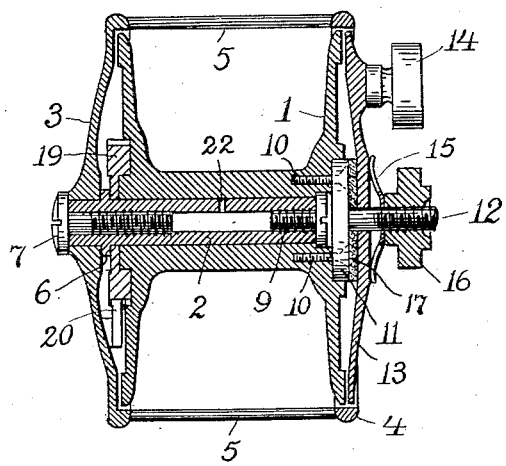
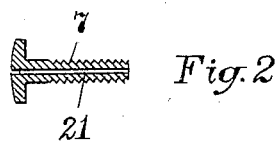
Fig.2
Inventor,
Leonard Atwood;
By A. B. Upham,
Attorney.

UNITED STATES PATENT OFFICE.

LEONARD ATWOOD, OF BOSTON, MASSACHUSETTS.

FISHING-REEL.

1,358,049.  Specification of Letters Patent.  Patented Nov. 9, 1920.

Application filed January 8, 1920. Serial No. 350,122.

*To all whom it may concern:*

Be it known that I, LEONARD ATWOOD, a citizen of the United States, and a resident of the city of Boston, in the county of Suffolk and Commonwealth of Massachusetts, have invented certain new and useful Improvements in Fishing-Reels, of which the following is a full, clear, and exact specification.

In a patent issued to me Nov. 5, 1918, No. 1,284,039, I have disclosed a fishing reel which accomplished several important functions, but was open to one objection disclosed only through considerable use in trout and bass fishing. This was that in casting the line, the reel failed to unwind as freely and rapidly as desired.

In my present invention, I have succeeded in overcoming this objection and have produced a reel which at a moment's notice can be made to unwind the line with perfect freedom, and which in addition possesses other advantages in details of construction hereinafter set forth.

Referring to the drawings forming part of this specification, Figure 1 is a central sectional view of a reel made in accordance with my invention. Fig. 2 is a longitudinal section of one of the fastening screws.

In the drawings, the reference numeral 1 designates the spool of my reel revolubly mounted on a hollow spindle 2. The spindle is rigidly held by the head 3 of the reel frame the other members of which consist of an annulus 4 and bars 5 joining the latter to the head 3; said head being clamped between the shoulder 6 on the spindle and a screw-head 7. For retaining the spool 1 upon this spindle, a screw 9 is tapped into the end of the spindle 2 having its head engaging the spool. Attached to the spool by suitable means, as screws 10, is a disk 11 having a threaded stem 12 either integral therewith or otherwise made rigid therewith, both disk and stem being concentric with the spindle and spool.

Upon this stem 12 is mounted a loose head 13 having its edge close within the annulus 4, and rotatable by means of a crank 14. Upon the stem exterior to the head 13 is a star spring 15 and a thumb nut 16, and between the loose head 13 and the disk 11 is a washer 17 composed of leather or other suitable friction-engendering material. By screwing in the nut 16 the spring pressure so increases the friction between the head 13, the washer 17 and the disk 11 that the turning of the crank 14 turns the spool with it.

By only partially compressing the spring 15, the spool can be wound yieldingly, or the crank 14 can be held stationary and the spool be permitted to resistingly unwind.

The toothed wheel 19 fastened to the spool 1 and engaged by a detent 20 similar to that shown in my above recited patent, gives other possibilities of operation to the reel, but the main value of this present construction consists in the manner in which the yielding pressure of the spring 15 and the pull of the stem 12 are directly resisted by the adjacent end of the spool, thereby giving more perfect gradations in resilient grip on the spool, and a perfectly firm hold by the crank 14 when desired.

For lubricating the spool, I prefer to provide the screw 7 with a longitudinal hole 21 extending through it to give access to the space within the tubular spindle 2, for the introduction of oil into the latter, from which the oil can percolate through a fine hole 22 to the surfaces in contact. Fig. 2 shows this construction of the screw 7.

What I claim is:

1. A fishing reel comprising a supporting spindle, a spool rotative thereon, a threaded stem attached to the outer end of the spool, a bearing surface concentric with the stem and rigid therewith, a loose head rotatable on the stem having a crank, a thumb nut on the stem, resiliently yielding means between said nut and head, and friction material between the head and bearing surface.

2. A reel comprising a supporting spindle, a spool rotative thereon, a disk attached to the outer end of the spool, a threaded stem projecting from said spool disk concentric with the spindle, a friction washer located on said stem in contact with said disk, a loose head rotative on said stem, and a nut and spring on said stem for pressing said head against said friction washer.

3. A reel comprising a supporting spindle, a spool rotative thereon, a large headed screw tapped into the outer end of said spindle embedded in the spool for retaining the latter in place on the spindle, a disk attached to the spool at the outer end thereof, a threaded stem projecting from said disk in axial alinement with said spindle, a friction washer mounted on said stem against said disk, a loose head rotatably mounted on said stem, a nut on the outer end of said spindle and resiliently compressible means between said nut and head.

4. A reel comprising a reel frame having a head, a spindle rigidly supported by said head, a spool rotatable on said spindle, means for holding the spool against withdrawal from the spindle, a loose head having turning means rotatably supported by said spool, and means attached to the outer end of said spool for producing and varying frictional pressure between said head and spool.

5. A reel comprising a reel frame having a head, a tubular spindle having a shoulder, a screw tapped into the end of said spindle to hold said head between said shoulder and the head of the screw, said screw having an axial hole through it to give oiling access to the interior of the spindle, a spool rotative on the spindle, a screw tapped into the outer end of said spindle to retain the spool thereon, and frictionally variable means for rotating said spool, a small hole being formed radially in the spindle for permitting the access of oil from within the spindle to the outer surface thereof.

In testimony that I claim the foregoing invention, I have hereunto set my hand this 5th day of January, 1920.

LEONARD ATWOOD.